United States Patent
Brown et al.

(10) Patent No.: US 9,195,466 B2
(45) Date of Patent: Nov. 24, 2015

(54) FUSING CONDITIONAL WRITE INSTRUCTIONS HAVING OPPOSITE CONDITIONS IN INSTRUCTION PROCESSING CIRCUITS, AND RELATED PROCESSOR SYSTEMS, METHODS, AND COMPUTER-READABLE MEDIA

(71) Applicant: QUALCOMM Incorporated, San Diego, CA (US)

(72) Inventors: Melinda J. Brown, Raleigh, NC (US); James Norris Dieffenderfer, Apex, NC (US); Michael Scott McIlvaine, Raleigh, NC (US); Brian Michael Stempel, Raleigh, NC (US); Rodney Wayne Smith, Raleigh, NC (US); Jeffery M. Schottmiller, Raleigh, NC (US); Andrew S. Irwin, Raleigh, NC (US); Michael William Morrow, Wilkes-Barre, PA (US)

(73) Assignee: QUALCOMM Incorporated, San Diego, CA (US)

( * ) Notice: Subject to any disclaimer, the term of this patent is extended or adjusted under 35 U.S.C. 154(b) by 530 days.

(21) Appl. No.: 13/676,146

(22) Filed: Nov. 14, 2012

(65) Prior Publication Data

US 2013/0311754 A1    Nov. 21, 2013

Related U.S. Application Data

(60) Provisional application No. 61/647,572, filed on May 16, 2012.

(51) Int. Cl.
*G06F 7/38* (2006.01)
*G06F 9/00* (2006.01)
*G06F 9/38* (2006.01)
*G06F 9/30* (2006.01)

(52) U.S. Cl.
CPC ............ *G06F 9/3867* (2013.01); *G06F 9/3017* (2013.01); *G06F 9/30043* (2013.01); *G06F 9/30072* (2013.01)

(58) Field of Classification Search
CPC .. G06F 9/3017; G06F 9/30094; G06F 9/3867
See application file for complete search history.

(56) References Cited

U.S. PATENT DOCUMENTS

| 5,774,687 A | 6/1998 | Nakamura et al. |
| 6,490,674 B1 | 12/2002 | Arnold et al. |
| 7,139,902 B2 | 11/2006 | Lee |

(Continued)

FOREIGN PATENT DOCUMENTS

| EP | 2372529 A1 | 10/2011 |
| WO | WO2012003997 A1 | 1/2012 |

OTHER PUBLICATIONS

International Search Report and Written Opinion—PCT/US2013/041290—ISA/EPO—Aug. 22, 2013.

*Primary Examiner* — Hyun Nam
(74) *Attorney, Agent, or Firm* — Nicholas John Pauley; Elaine H. Lo

(57) ABSTRACT

Fusing conditional write instructions having opposite conditions in instruction processing circuits and related processor systems, methods, and computer-readable media are disclosed. In one embodiment, a first conditional write instruction writing a first value to a target register based on evaluating a first condition is detected by an instruction processing circuit. The circuit also detects a second conditional write instruction writing a second value to the target register based on evaluating a second condition that is a logical opposite of the first condition. Either the first condition or the second condition is selected as a fused instruction condition, and corresponding values are selected as if-true and if-false values. A fused instruction is generated for selectively writing the if-true value to the target register if the fused instruction condition evaluates to true, and selectively writing the if-false value to the target register if the fused instruction condition evaluates to false.

25 Claims, 11 Drawing Sheets

(56) References Cited

U.S. PATENT DOCUMENTS

| | | |
|---|---|---|
| 7,797,517 B1 | 9/2010 | Favor |
| 2002/0019929 A1 | 2/2002 | Kurata |
| 2011/0264891 A1 | 10/2011 | Parks |
| 2011/0264896 A1* | 10/2011 | Parks ............................ 712/221 |
| 2011/0264897 A1* | 10/2011 | Henry et al. ................... 712/226 |
| 2013/0290683 A1* | 10/2013 | Brown et al. ................. 712/220 |

\* cited by examiner

FUSING CONDITIONAL WRITE INSTRUCTIONS HAVING OPPOSITE CONDITIONS IN INSTRUCTION PROCESSING CIRCUITS, AND RELATED PROCESSOR SYSTEMS, METHODS, AND COMPUTER-READABLE MEDIA

PRIORITY APPLICATION

The present application claims priority to U.S. Provisional Patent Application Ser. No. 61/647,572 entitled "FUSING CONDITIONAL INSTRUCTIONS HAVING OPPOSITE CONDITIONS IN INSTRUCTION PROCESSING CIRCUITS, AND RELATED PROCESSOR SYSTEMS, METHODS AND COMPUTER-READABLE MEDIA" filed on May 16, 2012, which is hereby incorporated herein by reference in its entirety.

BACKGROUND

I. Field of the Disclosure

The technology of the disclosure relates generally to processing of pipelined computer instructions in central processing unit (CPU)-based systems.

II. Background

The advent of "instruction pipelining" in modern computer architectures has yielded improved utilization of CPU resources and faster execution times of computer applications. Instruction pipelining is a processing technique whereby a throughput of computer instructions being processed by a CPU may be increased by splitting the processing of each instruction into a series of steps. The instructions are then executed in a "processor pipeline" composed of multiple stages, with each stage carrying out one of the steps for each of a series of instructions. As a result, in each CPU clock cycle, steps for multiple instructions may be evaluated in parallel. A CPU may employ multiple processor pipelines to further boost performance.

The performance of a CPU in a pipelined computing architecture may be hampered both by the issuance of unnecessary or redundant instructions, as well as by the occurrence of pipeline "hazards," which may prevent an issued instruction from executing during its designated CPU clock cycle. For instance, in some instruction set architectures, execution of a conditional write instruction may include reading a value from a target register, evaluating a condition, and writing a value to the target register based on the evaluation of the condition. In such a case, a pipeline hazard (specifically, a "read-after—write" hazard) may be encountered. To resolve the read-after-write hazard, the CPU may "stall" or delay execution of the second conditional write instruction until the first conditional write instruction has completely executed, thus further decreasing the effective throughput of the CPU.

SUMMARY OF THE DISCLOSURE

Embodiments of the disclosure provide fusing conditional write instructions having opposite conditions in instruction processing circuits. Related processor systems, methods, and computer-readable media are also disclosed. In this regard, in one embodiment, an instruction processing circuit is provided. The instruction processing circuit is configured to detect a first conditional write instruction in an instruction stream indicating an operation writing a first value to a target register based on evaluating a first condition. The instruction processing circuit is also configured to detect a second conditional write instruction in the instruction stream indicating an operation writing a second value to the target register based on evaluating a second condition that is a logical opposite of the first condition. The instruction processing circuit is further configured to select one of the first condition or the second condition as a fused instruction condition. The instruction processing circuit is additionally configured to select one of the first value or the second value corresponding to the fused instruction condition as an if-true value, and to select one of the first value or the second value not corresponding to the fused instruction condition as an if-false value. The instruction processing circuit is also configured to generate a fused instruction indicating an operation selectively writing the if-true value to the target register if the fused instruction condition evaluates to true, and selectively writing the if-false value to the target register if the fused instruction condition evaluates to false. In this manner, the generation of the fused instruction improves performance of a CPU by avoiding issuance of redundant instructions and by removing a potential for a read-after-write hazard.

In another embodiment, an instruction processing circuit is provided, which comprises a means for detecting a first conditional write instruction in an instruction stream indicating an operation writing a first value to a target register based on evaluating a first condition. The instruction processing circuit also comprises a means for detecting a second conditional write instruction in the instruction stream indicating an operation writing a second value to the target register based on evaluating a second condition that is a logical opposite of the first condition. The instruction processing circuit further comprises a means for selecting one of the first condition or the second condition as a fused instruction condition. The instruction processing circuit additionally comprises a means for selecting one of the first value or the second value corresponding to the fused instruction condition as an if-true value; and a means for selecting one of the first value or the second value not corresponding to the fused instruction condition as an if-false value. The instruction processing circuit also comprises a means for generating a fused instruction indicating an operation selectively writing the if-true value to the target register if the fused instruction condition evaluates to true, and selectively writing the if-false value to the target register if the fused instruction condition evaluates to false.

In another embodiment, a method for processing computer instructions is provided. The method comprises detecting a first conditional write instruction in an instruction stream indicating an operation writing a first value to a target register based on evaluating a first condition. The method also comprises detecting a second conditional write instruction in the instruction stream indicating an operation writing a second value to the target register based on evaluating a second condition that is a logical opposite of the first condition. The method further comprises selecting one of the first condition or the second condition as a fused instruction condition. The method additionally comprises selecting one of the first value or the second value corresponding to the fused instruction condition as an if-true value, and selecting one of the first value or the second value not corresponding to the fused instruction condition as an if-false value. The method also comprises generating a fused instruction indicating an operation selectively writing the if-true value to the target register if the fused instruction condition evaluates to true, and selectively writing the if-false value to the target register if the fused instruction condition evaluates to false.

In another embodiment, a non-transitory computer-readable medium is provided, having stored thereon computer-executable instructions to cause a processor to implement a method for detecting a first conditional write instruction in an instruction stream indicating an operation writing a first value to a target register based on evaluating a first condition. The method implemented by the computer-executable instructions further includes detecting a second conditional write instruction in the instruction stream indicating an operation writing a second value to the target register based on evaluating a second condition that is a logical opposite of the first condition. The method implemented by the computer-executable instructions also includes selecting one of the first condition or the second condition as a fused instruction condition. The method implemented by the computer-executable instructions additionally includes selecting one of the first value or the second value corresponding to the fused instruction condition as an if-true value, and selecting one of the first value or the second value not corresponding to the fused instruction condition as an if-false value. The method implemented by the computer-executable instructions also includes generating a fused instruction indicating an operation selectively writing the if-true value to the target register if the fused instruction condition evaluates to true, and selectively writing the if-false value to the target register if the fused instruction condition evaluates to false.

DETAILED DESCRIPTION

Figure 1:
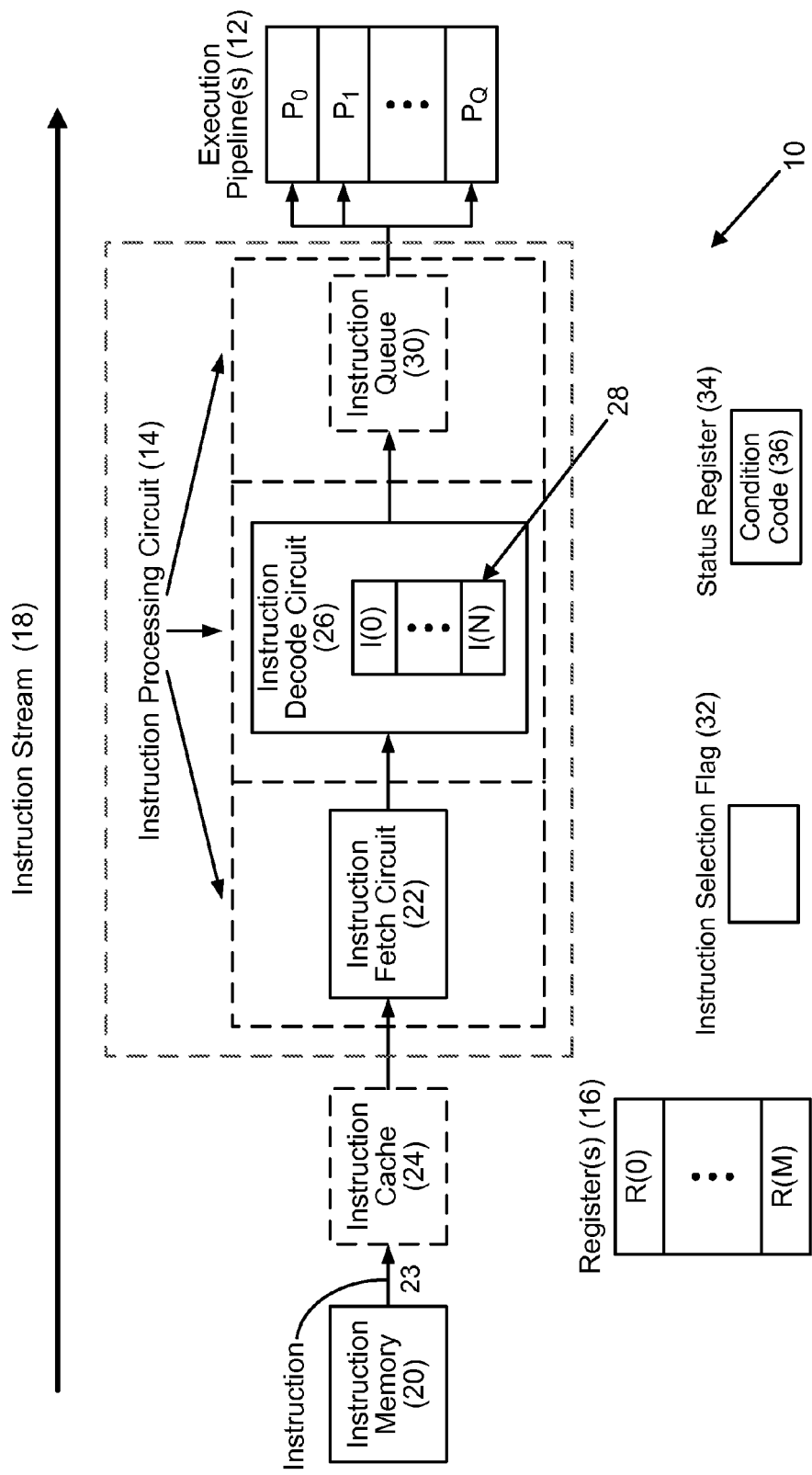
FIG. 1 is a block diagram of exemplary components provided in a processor-based system for retrieving and processing computer instructions to be placed into one or more execution pipelines, including an exemplary instruction processing circuit configured to fuse conditional write instructions having opposite conditions.

With reference now to the drawing figures, several exemplary embodiments of the present disclosure are described.

The word "exemplary" is used herein to mean "serving as an example, instance, or illustration." Any embodiment described herein as "exemplary" is not necessarily to be construed as preferred or advantageous over other embodiments. It is also to be understood that, although the terms "first," "second," etc, may be used herein to describe various elements, these terms are only used to distinguish one element from another, and the elements thus distinguished are not to be limited by these terms. For example, a first instruction could be termed a second instruction, and, similarly, a second instruction could be termed a first instruction, without departing from the teachings of the disclosure.

Embodiments of the disclosure provide fusing conditional write instructions having opposite conditions in instruction processing circuits. Related processor systems, methods, and computer-readable media are also disclosed. In this regard, in one embodiment, an instruction processing circuit is provided. The instruction processing circuit is configured to detect a first conditional write instruction in an instruction stream indicating an operation writing a first value to a target register based on evaluating a first condition. The instruction processing circuit is also configured to detect a second conditional write instruction in the instruction stream indicating an operation writing a second value to the target register based on evaluating a second condition that is a logical opposite of the first condition. The instruction processing circuit is further configured to select one of the first condition or the second condition as a fused instruction condition. The instruction processing circuit is additionally configured to select one of the first value or the second value corresponding to the fused instruction condition as an if-true value, and to select one of the first value or the second value not corresponding to the fused instruction condition as an if-false value. The instruction processing circuit is also configured to generate a fused instruction indicating an operation selectively writing the if-true value to the target register if the fused instruction condition evaluates to true, and selectively writing the if-false value to the target register if the fused instruction condition evaluates to false. In this manner, the generation of the fused instruction improves performance of a CPU by avoiding issuance of redundant instructions, and by removing a potential for a read-after-write hazard and its associated consequences caused by dependencies between the conditional write instructions in a pipelined computing architecture.

In this regard, FIG. 1 is a block diagram of an exemplary processor-based system 10 for retrieving and processing computer instructions to be placed into one or more execution pipelines 12(0-Q). As will be discussed in more detail below, the processor-based system 10 provides an instruction processing circuit 14 that is configured to generate a fused instruction based on conditional write instructions having opposite conditions. For example, instructions may indicate operations for reading data from and/or writing data to registers 16(0-M), which provide local high-speed storage accessible by the processor-based system 10. As discussed herein, "instructions" may refer to a combination of bits defined by an instruction set architecture that direct a computer processor to carry out a specified task or tasks. Exemplary instruction set architectures include, but are not limited to, ARM, Thumb, and A64 architectures.

With continuing reference to FIG. 1, instructions are processed in the processor-based system 10 in a continuous flow represented by an instruction stream 18. The instruction stream 18 may continuously advance as the processor-based system 10 is operating and executing the instructions. In this illustrated example, the instruction stream 18 begins with an instruction memory 20, which provides persistent storage for the instructions in a computer-executable program.

An instruction fetch circuit 22 reads an instruction represented by arrow 23 from the instruction memory 20 and/or optionally from an instruction cache 24. The instruction fetch circuit 22 may increment a program counter, typically stored in one of the registers 16(0-M). The instruction cache 24 is an optional buffer that may be provided and coupled to the instruction memory 20 and to the instruction fetch circuit 22 to allow direct access to cached instructions by the instruction fetch circuit 22. The instruction cache 24 may speed up instruction retrieval times, but at a cost of potentially longer read times if an instruction has not been previously stored in the instruction cache 24.

Once the instruction is fetched by the instruction fetch circuit 22, it proceeds to an instruction decode circuit 26, which translates the instruction into processor-specific microinstructions. In this embodiment, the instruction decode circuit 26 holds a group of multiple instructions 28(0-N) simultaneously for decoding. After the instructions have been fetched and decoded, they are optionally issued to an instruction queue 30 (i.e., a buffer for storing instructions), or they may be issued to one of the execution pipelines 12(0-Q) for execution. In some embodiments, the execution pipelines 12(0-Q) may restrict the types of operations that may be carried out by instructions that execute within the execution pipelines 12(0-Q). For example, pipeline $P_0$ may not permit read access to the registers 16(0-M); accordingly, an instruction that indicates an operation to read register $R_0$ may only be issued to one of the execution pipelines $P_1$ through $P_Q$.

With continuing reference to FIG. 1, the instruction processing circuit 14 is configured to detect conditional write instructions having opposite conditions, and generate a fused instruction to remove redundant instructions and eliminate a potential for read-after-write hazards for these instructions. The instruction processing circuit 14 may be any type of device or circuit, and may be implemented or performed with a processor, a DSP, an Application Specific Integrated Circuit (ASIC), an FPGA or other programmable logic device, discrete gate or transistor logic, discrete hardware components, or any combination thereof designed to perform the functions described herein. In some embodiments, the instruction processing circuit 14 is incorporated into the instruction fetch circuit 22, the instruction decode circuit 26, and/or the optional instruction queue 30. The instruction processing circuit 14 may also employ an instruction selection flag 32 to determine which detected conditional write instruction may be replaced in the instruction stream 18 by the fused instruction, as will be discussed in more detail with respect FIG. 4C. Additionally, some embodiments of the instruction processing circuit 14 may use a status register 34 to store a condition code 36, which represents information regarding a state of the instructions executing in the instruction stream 18 (e.g., the results of a comparison instruction).

Figure 2:
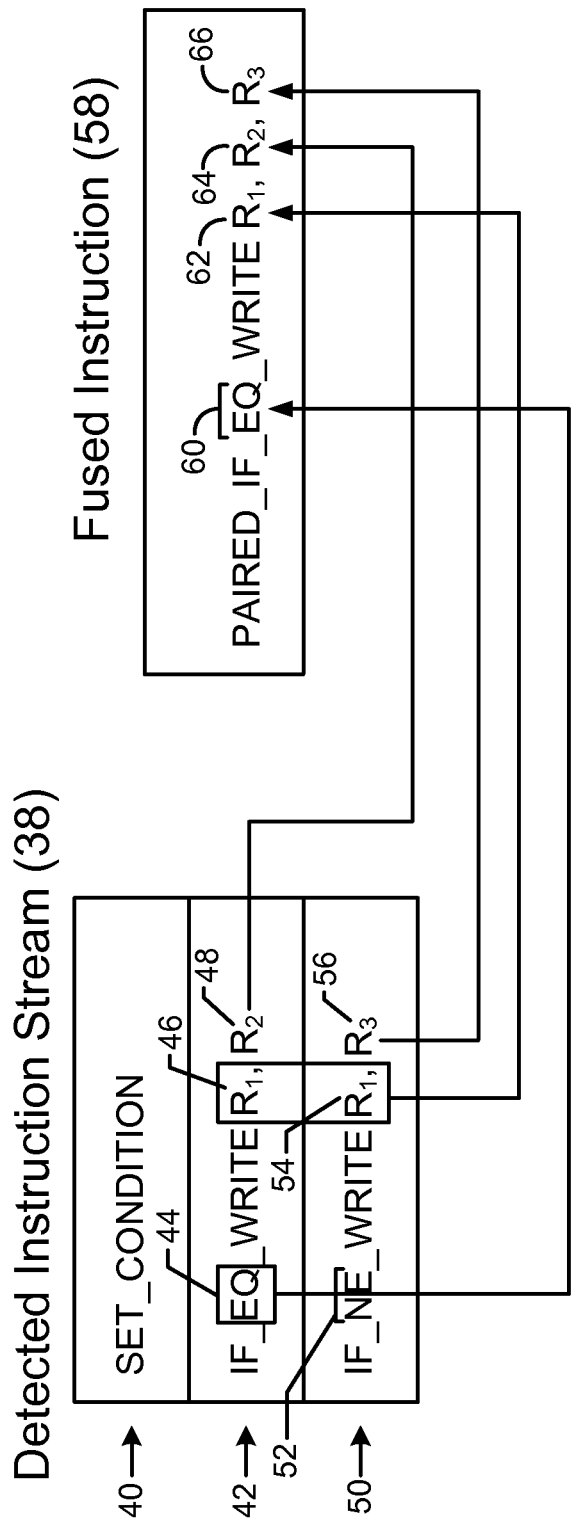
FIG. 2 is a diagram illustrating an exemplary fused instruction generated based on detecting a first conditional write instruction indicating an operation writing a first immediate value to a register, and detecting a second conditional write instruction, having a condition that is logically opposite to that of the first conditional write instruction, that writes a second immediate value to the same register.

To provide an explanation of fusing conditional write instructions having opposite conditions in the processor-based system 10 of FIG. 1, FIG. 2 is provided. FIG. 2 illustrates an exemplary fused instruction generated by the instruction processing circuit 14 of FIG. 1. In this example, a detected instruction stream 38 represents a series of instructions fetched from the instruction stream 18 and detected by the instruction processing circuit 14 of FIG. 1. First in the detected instruction stream 38 is a SET_CONDITION instruction 40, which represents an instruction that results in setting the condition code 36 in the status register 34 of FIG. 1. For instance, in some embodiments, the SET_CONDITION instruction 40 may comprise an instruction comparing the contents of two of the registers 16(0-M) shown in FIG. 1 (such as, for instance, the ARM architecture CMP instruction). The SET_CONDITION instruction 40 may, in some embodiments, comprise a plurality of instructions indicating a plurality of operations that collectively set the condition code 36 in the status register 34 of FIG. 1.

A first conditional write instruction 42 is then detected in the detected instruction stream 38. In this example, the first conditional write instruction 42 is an IF_EQ_WRITE ("if equal, then write") instruction, which evaluates a first condition 44 of "EQ" or "equals," and also specifies a target register designated by an operand 46 and a source register designated by an operand 48. In this example, the operands 46, 48 each point to one of the registers 16(0-M), referred to in this example as target register $R_1$ and source register $R_2$, respectively. The IF_EQ_WRITE first conditional write instruction 42 indicates an operation to write a value of the source register $R_2$ into the target register $R_1$ if the condition code 36 in the status register 34 of FIG. 1 indicates an "equal" condition. In some embodiments, the IF_EQ_WRITE first condition write instruction 42 may read the target register $R_1$ prior to evaluating whether the condition code 36 indicates an "equal" condition. This may enable the IF_EQ_WRITE first condition write instruction 42 to restore the original value of the target register $R_1$ if the condition code 36 does not indicate an "equal" condition. It is to be understood that the IF_EQ_WRITE first conditional write instruction 42 may be fetched immediately following the SET_CONDITION instruction 40 in the detected instruction stream 38, or the IF_EQ_WRITE first conditional write instruction 42 and the SET_CONDITION instruction 40 may be separated in the detected instruction stream 38 by other intervening instructions.

Further along in the detected instruction stream 38 is a second conditional write instruction 50, which here is an IF_NE_WRITE ("if not equal, then write") instruction evaluating a second condition 52 of "NE" or "not equals" (i.e., a condition that is the logical opposite of the first condition 44). The IF_NE_WRITE second conditional write instruction 50 also specifies a target register designated by operand 54 and a source register designated by operand 56. In this example, the operand 54 points to target register $R_1$, while the operand 56 points to one of the registers 16(0-M), referred to in this example as source register $R_3$. The IF_NE_WRITE second conditional write instruction 50 indicates an operation to write a value of the source register $R_3$ into the target register $R_1$ if the condition code 36 in the status register 34 of FIG. 1 indicates a "not equal" condition (i.e., the logical opposite of the first condition 44 of the IF_EQ_WRITE first conditional write instruction 42). As seen in FIG. 2, the operand 54 of the IF_NE_WRITE second conditional write instruction 50 designates the same target register $R_1$ as the operand 46 of the IF_EQ_WRITE first conditional write instruction 42. It is to be understood that the IF_NE_WRITE second conditional write instruction 50 may be fetched immediately following the IF_EQ_WRITE first conditional write instruction 42 in the detected instruction stream 38, or the IF_NE_WRITE second conditional write instruction 50 and the IF_EQ_WRITE first conditional write instruction 42 may be separated in the detected instruction stream 38 by other intervening instructions.

In some embodiments, the IF_NE_WRITE second conditional write instruction 50 may read the target register $R_1$ prior to evaluating whether the condition code 36 indicates a "not equal" condition. In this manner, the IF_NE_WRITE second conditional write instruction 50 may restore the original value of the target register $R_1$ if the condition code 36 does not indicate a "not equal" condition. However, it is to be understood that this may also create the potential for a read-after-write hazard between the IF_NE_WRITE second conditional write instruction 50 and the IF_EQ_WRITE first conditional write instruction 42.

The instruction processing circuit 14 of FIG. 1 then generates a fused instruction 58, which in this example is a PAIRED_IF_EQ_WRITE ("paired if equal, then write") instruction. The PAIRED_EQ_WRITE fused instruction 58 in this example evaluates a fused instruction condition 60, which is the same as the first condition 44 of the IF_EQ_WRITE first conditional write instruction 42 (i.e., "EQ" or "equals"). The PAIRED_IF_EQ_WRITE fused instruction 58 also specifies a target register $R_1$ designated by an operand 62, an "if-true" value designated by an operand 64, and an "if-false" value designated by an operand 66. If the fused instruction condition 60 of the PAIRED_IF_EQ_WRITE fused instruction 58 evaluates to true, the PAIRED_IF_EQ_WRITE fused instruction 58 will write a value of the register or immediate value designated by the operand 64 to the target register $R_1$; if false, the PAIRED_IF_EQ_WRITE fused instruction 58 will write a value of the register or immediate value designated by the operand 66 to the target register $R_1$.

In this example, the PAIRED_IF_EQ_WRITE fused instruction 58 indicates an operation to write a value of the register $R_2$ (designated by the operand 64) into the target register $R_1$ (operand 62) if the condition code 36 in the status register 34 of FIG. 1 indicates an "equal" condition, and further indicates an operation to write a value of the register $R_3$ (operand 66) into the target register $R_1$ (operand 62) if the condition code 36 in the status register 34 of FIG. 1 indicates an "not equal" condition. By fusing the IF_EQ_WRITE first conditional write instruction 42 and the IF_NE_WRITE second conditional write instruction 50 into the PAIRED_IF_EQ_WRITE fused instruction 58, issuance of a redundant conditional write instruction is avoided, and a potential for a read-after-write hazard for the IF_EQ_WRITE/IF_NE_WRITE conditional instruction pair is eliminated.

As described above with respect to FIG. 2, the operand 48 and the operand 56 may each designate a register providing a value to be written to the target registers $R_1$ designated by the operands 46, 54, respectively, depending on the result of the SET_CONDITION instruction 40. In a typical embodiment, the operand 48 and the operand 56 designate different registers. According to some embodiments described herein, the operand 48 and the operand 56 may each designate an immediate value, with one of the immediate values being zero and the other immediate value being non-zero. According to some embodiments described herein, one of the operands 48, 56 may designate a register providing a value to be written to the target registers $R_1$, while the other may designate an immediate value having a value of zero or non-zero. Some embodiments may provide that the first conditional write instruction 42 is an IF_NE_WRITE instruction, and the second conditional write instruction 50 is an IF_EQ_WRITE instruction. In some embodiments, the fused instruction condition 60 may be the same as the second condition 52 (i.e., "NE" or "not equal"); in such embodiments, the values designated by the operand 64 and the operand 66 would be reversed. According to some embodiments, an IF_EQ_WRITE instruction is, for example, the ARM architecture MOVEQ instruction, while in some embodiments, an IF_NE_WRITE instruction may be, for example, the ARM architecture MOVNE instruction.

Figure 3:
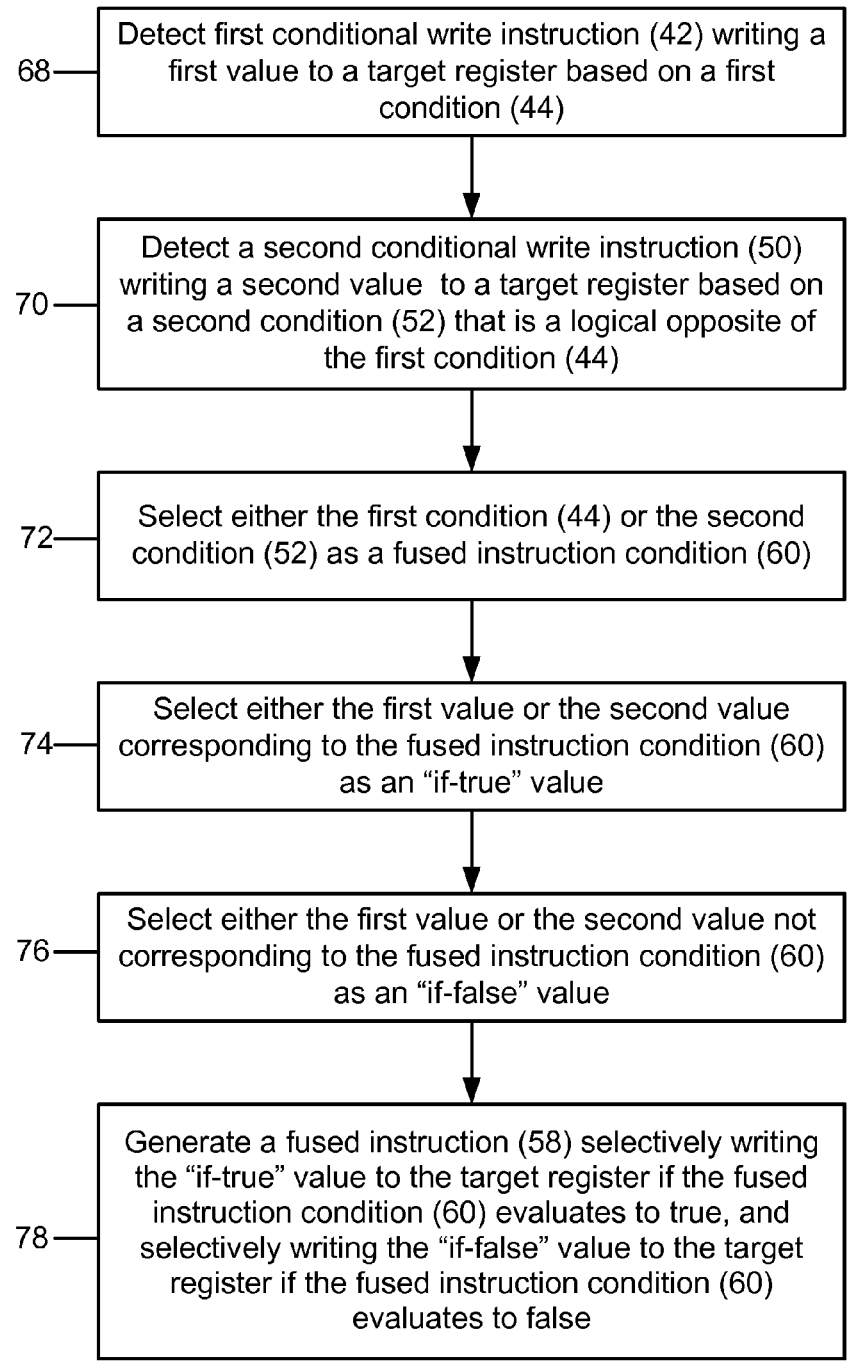
FIG. 3 is a flowchart illustrating an exemplary process of an instruction processing circuit for generating a fused instruction based on detecting conditional write instructions having opposite conditions.

To further illustrate fusing conditional write instructions having opposite conditions, an exemplary generalized process for an instruction processing circuit configured to detect conditional write instructions and generate a fused instruction is illustrated by FIG. 3, with further reference to FIGS. 1 and 2. In this example, the process begins by the instruction processing circuit 14 of FIG. 1 detecting the first conditional write instruction 42 writing a first value designated by the operand 48 to a target register (one of the registers 16(0-M)) indicated by the operand 46, based on evaluation of the first condition 44 (block 68). The instruction processing circuit 14 next detects the second conditional write instruction 50 writing a second value designated by the operand 56 to a target register indicated by the operand 54, based on evaluation of the second condition 52 (block 70). As noted above, the second condition 52 is the logical opposite of the first condition 44 (e.g., the first condition 44 may be "EQ" or "equals," and the second condition 52 may be "NE" or "not equals").

The instruction processing circuit 14 then selects either the first condition 44 or the second condition 52 to use as the fused instruction condition 60 (block 72). Either the first value or the second value corresponding to the fused instruction condition 60 is selected by the instruction processing circuit 14 as an "if-true" value designated by the operand 64 (block 74). The instruction processing circuit 14 also selects either the first value or the second value corresponding to the fused instruction condition 60 as an "if false" value designated by the operand 66 (block 76). The instruction processing circuit 14 then generates the fused instruction 58 to selectively write the "if-true" value to the target register if the fused instruction condition 60 evaluates to true, and to selectively write the "if-false" value to the target register if the fused instruction condition 60 evaluates to false (block 78).

Figure 4A:
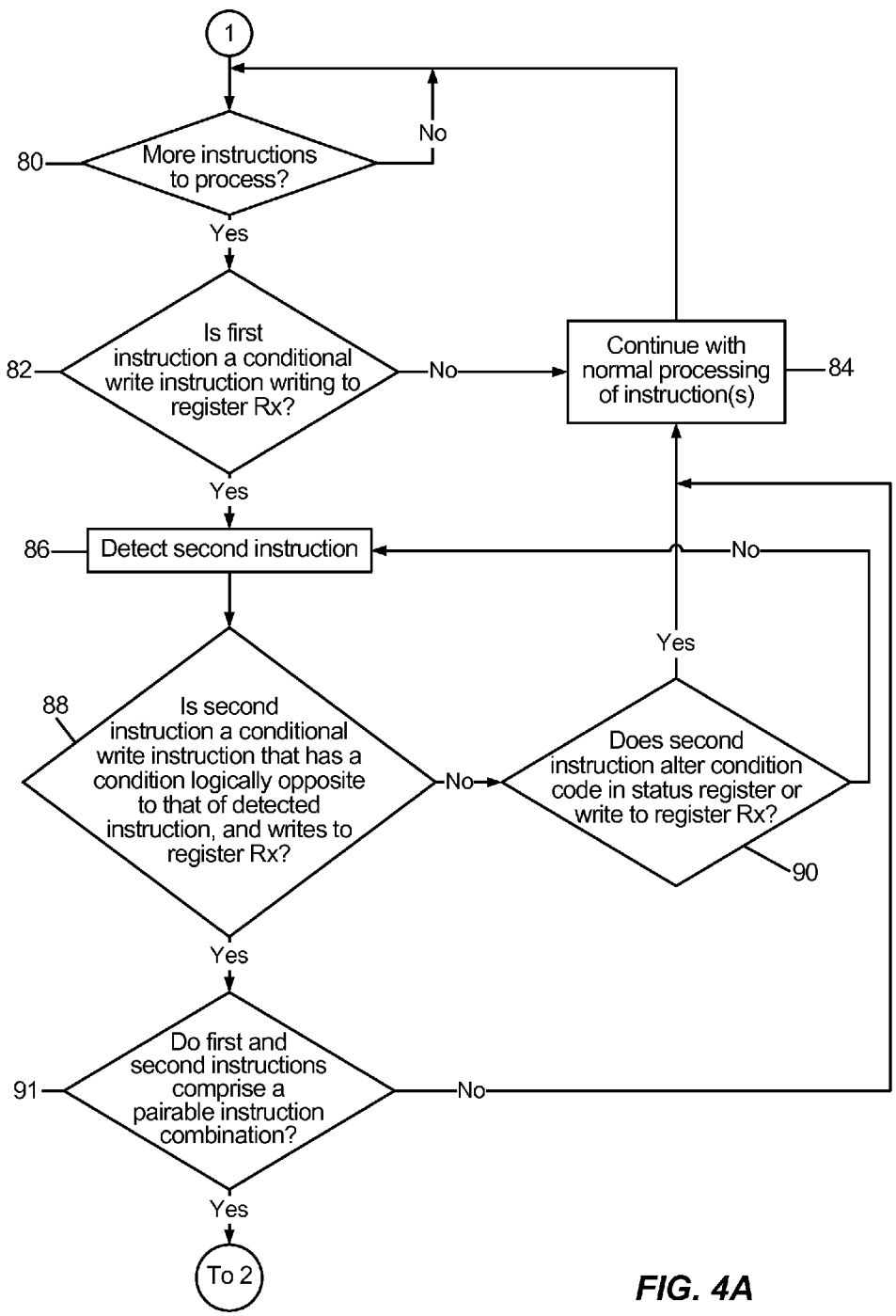
FIGS. 4A-4C are flowcharts illustrating a more detailed exemplary process of an instruction processing circuit for generating a fused instruction based on detecting conditional write instructions having opposite conditions and indicating an operation to write to a register.
Figure 4B:
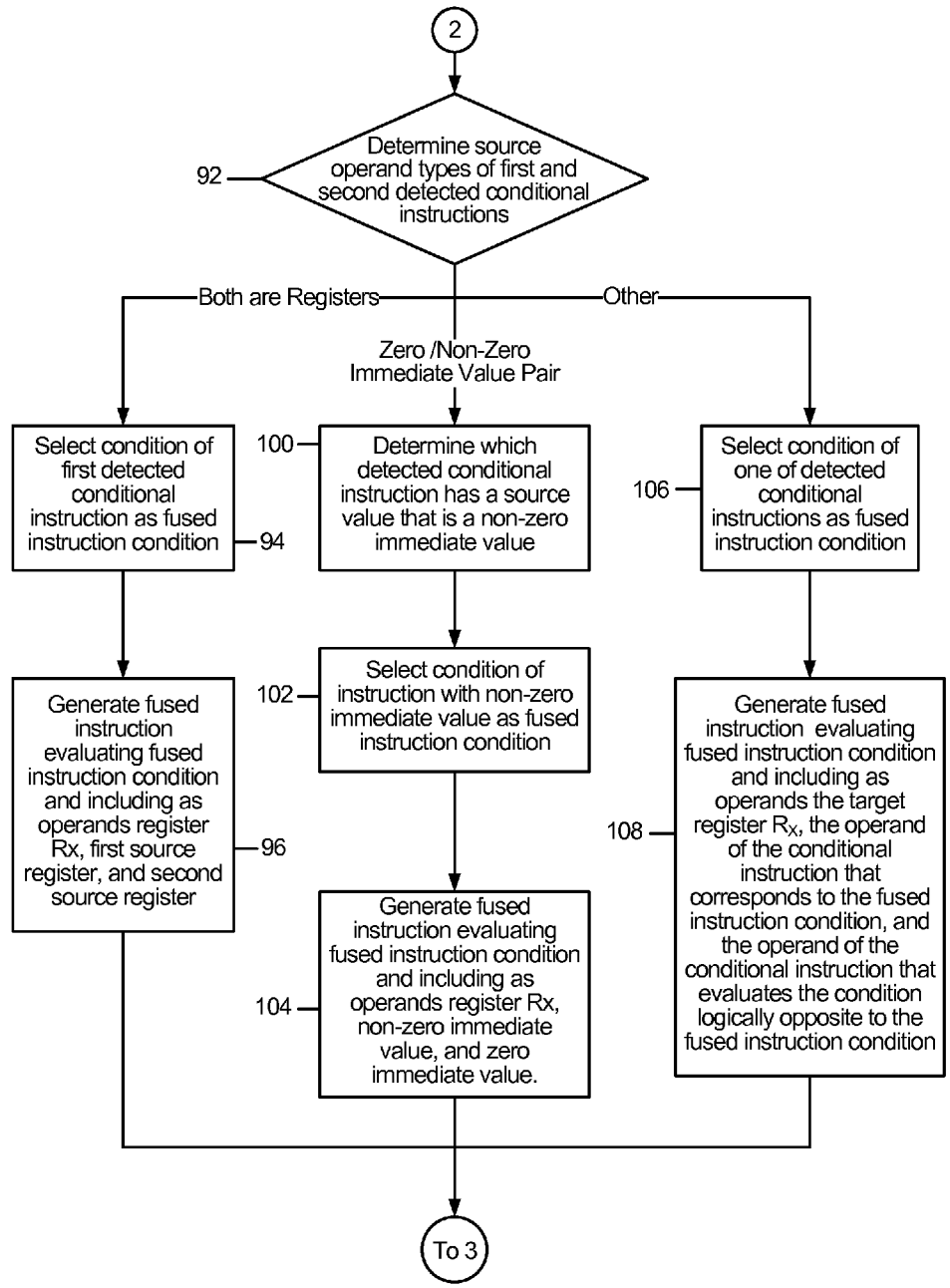
Figure 4C:
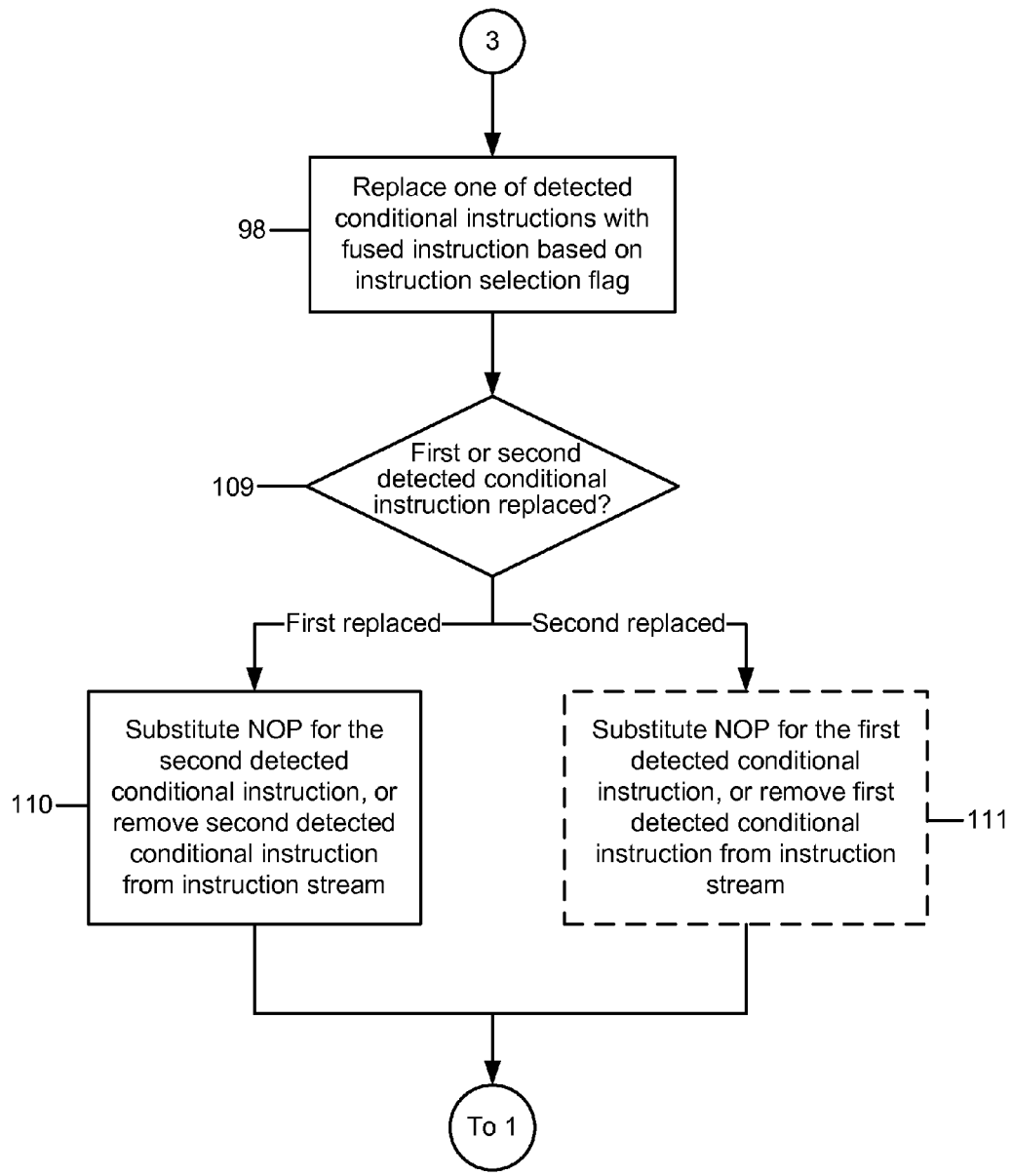

FIGS. 4A-4C illustrate a more detailed exemplary process of an instruction processing circuit (e.g., the instruction processing circuit 14 of FIG. 1) for detecting conditional write instructions having opposite conditions in an instruction stream (e.g., the instruction stream 18 of FIG. 1), and for generating a fused instruction (e.g., the fused instruction 58 of FIG. 2). FIG. 4A details a process for determining whether conditional write instructions that may be fused are detected in an instruction stream. FIG. 4B illustrates exemplary operations for generating a fused instruction depending on the type of operands of the detected conditional write instructions (e.g., operands specifying two registers, operands specifying a zero immediate value and a non-zero immediate value, or some other combination of register/immediate value operands). FIG. 4C shows operations for replacing one of the conditional write instructions in the instruction stream with a generated fused instruction.

The process in this example begins in FIG. 4A with the instruction processing circuit detecting whether more instructions remain to be processed (block 80). In some embodiments, this detection process is accomplished by detecting the presence of unprocessed instructions in an instruction fetch circuit and/or an instruction decode circuit (such as the instruction fetch circuit 22 and/or the instruction decode circuit 26, respectively, of FIG. 1). If no remaining instructions are detected, the instruction processing circuit returns to block 80 of FIG. 4A.

If any remaining instructions are detected, the instruction processing circuit determines whether a detected instruction ("first instruction") is a conditional write instruction indicating an operation writing to a target register (such as one of the registers 16(0-M) of FIG. 1, referred to in this example as target register $R_X$) (block 82 of FIG. 4A). Detection of such an instruction indicates that the instruction processing circuit may be able to convert the first instruction and a second conditional write instruction within the instruction stream into a fused instruction. In the event that the first instruction is not a conditional write instruction, there is no opportunity for generating a fused instruction, and processing of the first instruction continues (block 84 of FIG. 4A). The instruction processing circuit then returns to block 80 of FIG. 4A.

Returning to the decision point at block 82 of FIG. 4A, if the first instruction is a conditional write instruction, the instruction processing circuit detects a second instruction in the instruction stream (block 86 of FIG. 4A). The instruction processing circuit then determines whether the second instruction meets the following criteria: it is a conditional write instruction; it evaluates a condition that is the logical opposite of the condition evaluated by the first instruction; and it indicates an operation writing to the target register $R_X$, the same register written to by the first instruction (block 88 of FIG. 4A). If the second instruction fails to satisfy any one of these criteria, it is not a candidate for fusion with the first instruction; however, it may still be possible for another conditional write instruction fetched from further along in the instruction stream (i.e., a conditional write instruction not adjacent to the first instruction in the instruction stream) to be detected and used to generate a fused instruction.

In preparation for such a possibility, the instruction processing circuit determines whether the second instruction alters a condition code storing a result of a previous comparison (such as the condition code 36 in the status register 34 of FIG. 1), or writes to the target register $R_X$ (block 90 of FIG. 4A). If the former case is true, the previous value of the condition code will become inaccessible upon execution of the second instruction; if the latter case is true, it may not be possible to generate a fused instruction that accurately reproduces the effects of the detected conditional write instructions. Either of these occurrences, therefore, eliminates the possibility for generation of a fused instruction. In that case, processing of the first instruction and the second instruction continues (block 84 of FIG. 4A), and the instruction processing circuit then returns to block 80 of FIG. 4A.

If the instruction processing circuit determines at block 90 of FIG. 4A that the second instruction does not alter the condition code or the value previously written to the target register $R_X$, the instruction processing circuit returns to block 86 of FIG. 4A, where another instruction is detected in the instruction stream. As seen in FIG. 4A, this process then repeats as described above until either the instruction processing circuit detects an instruction that satisfies the criteria in block 88, or the instruction processing circuit detects an instruction that alters the condition code or the value stored in the target register in block 90.

Returning to the decision point at block 88 of FIG. 4A, if the second instruction meets the specified criteria (i.e., it is a conditional write instruction that evaluates a condition that is the logical opposite of the condition evaluated by the first instruction, and indicates an operation writing to the target register $R_X$), the instruction processing circuit next determines whether the first and second instructions together comprise a pairable instruction combination (block 91). Some embodiments may permit only particular pairs of instructions or only pairs of instructions having particular types of operands to be used for generating a fused instruction. For example, in some embodiments, a fused instruction may only be generated based upon a pair of instructions in which both instructions specify register operands, or a pair of instructions in which one instruction specifies anon-zero immediate value and the other instruction specifies an immediate value of zero. If the first and second instructions do not comprise a pairable instruction combination, processing of the first instruction and the second instruction continues (block 84 of FIG. 4A), and the instruction processing circuit then returns to block 80 of FIG. 4A.

If the instruction processing circuit determines at block 91 of FIG. 4A that the first and second instructions comprise a pairable instruction combination, the instruction processing circuit proceeds to block 92, of FIG. 4B. It is to be understood that, at this point, the first instruction and the second instruction may have been fetched adjacently from the instruction stream, or they may have been separated in the instruction stream by other intervening instructions. The instruction processing circuit determines the operand types of the first instruction and the second instruction, and selects a course of action based on the determined operand types (block 92 of FIG. 43). In some embodiments, discussed below with respect to FIGS. 5 and 6, the selection of a condition to be evaluated by the generated fused instruction may be based upon the types of operands of the first instruction and the second instruction.

If the instruction processing circuit determines, at the decision point in block 92, of FIG. 4B, that the source operands for the first instruction and the second instruction are both registers, the instruction processing circuit in this example selects the condition evaluated by the first instruction as a fused instruction condition (block 94 of FIG. 43). The instruction processing circuit generates a fused instruction that evaluates the fused instruction condition, and specifies as operands the target register $R_X$, the source register of the first instruction, and the source register of the second instruction (block 96 of FIG. 4B). Although not illustrated in this example, it is to be understood that, in some embodiments, the condition evaluated by the second instruction could be selected as the fused instruction condition, in which case the instruction processing circuit would specify as operands the target register $R_X$, the source register of the second instruction, and the source register of the first instruction. Processing then resumes at block 98 of FIG. 4C, as discussed in greater detail below.

Figure 5:
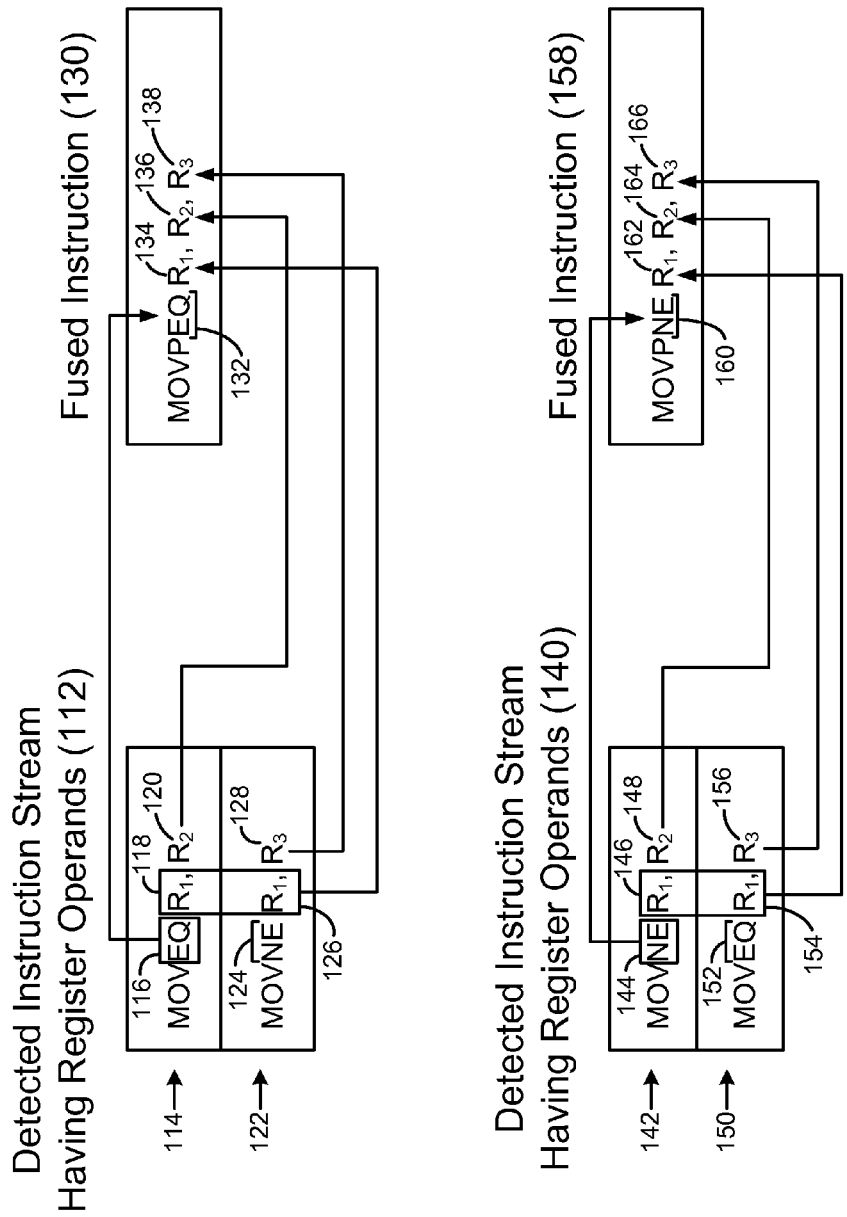
FIG. 5 is a diagram illustrating exemplary fused instructions generated based on conditional write instructions having register operands and opposite conditions.

To better illustrate an exemplary generation of a fused instruction, in some embodiments, based on conditional write instructions having register operands as described in blocks 94 and 96 of FIG. 4B, FIG. 5 is provided. In FIG. 5, a detected instruction stream 112 depicts a series of instructions detected by the instruction processing circuit 14 as they proceed through the instruction stream 18 of FIG. 1. It is assumed, for purposes of this example, that one or more previous instructions have caused the condition code 36 in the status register 34 of FIG. 1 to indicate either an "equal" or a "not equal" condition (i.e., one of two logically opposite conditions). Detected first in the detected instruction stream 112 is a first conditional write instruction 114, which in this example is the ARM architecture MOVEQ ("move if equal") instruction. The MOVEQ first conditional write instruction 114 processes the condition code 36 by evaluating a first condition 116 (i.e., "EQ" or "equal"). The MOVEQ first conditional write instruction 114 also specifies a target register (one of the registers 16(0-M) of FIG. 1) designated by an operand 118, and a source register (also one of the registers 16(0-M)) designated by an operand 120, in this example, register $R_1$ is the target register, and register $R_2$ is the source register. The MOVEQ first conditional write instruction 114 indicates an operation writing the value of the source register $R_2$ designated by the operand 120 into the target register $R_1$ designated by the operand 118 if the condition code 36 indicates an "equal" condition.

Further along in the detected instruction stream 112 is a second conditional write instruction 122, which in this example is the ARM architecture MOVNE ("move if not equal") instruction. The MOVNE second conditional write instruction 122 processes the condition code 36 by evaluating a second condition 124 ("NE" or "not equal," which is the logical opposite of the first condition 116). The MOVNE second conditional write instruction 122 also specifies a target register designated by an operand 126 (which is the same register designated by the operand 118 of the MOVEQ first conditional write instruction 114), and a source register (one of the registers 16(0-M) of FIG. 1) designated by an operand 128. In this example, register $R_1$ is the target register, and register $R_3$ is the source register. The MOVNE second conditional write instruction 122 indicates an operation writing the value of the source register $R_3$ designated by the operand 128 into the target register $R_1$ designated by the operand 126 if the condition code 36 indicates a "not equal" condition.

A fused instruction 130 illustrates the results of processing the MOVEQ first conditional write instruction 114 and the MOVNE second conditional write instruction 122 by the instruction processing circuit 14 of FIG. 1. The fused instruction 130 evaluates a fused instruction condition 132, and also specifies a target register designated by an operand 134, an "if-true" source value designated by an operand 136, and an "if-false" source value designated by an operand 138. In the embodiment illustrated in FIG. 5, if the operand 120 of the MOVEQ first conditional write instruction 114 and the operand 128 of the MOVNE second conditional write instruction 122 both specify registers, the fused instruction 130 is generated according to the following rules: the first condition 116 of the MOVEQ first conditional write instruction 114 is used as the fused instruction condition 132; the operand 134 designates the same target register as the operand 118 and the operand 126; the operand 136 designates the source register identified by the operand 120 as the "if-true" source value; and the operand 138 designates the source register identified by the operand 128 as the "if-false" source value. Although not illustrated in this example, it is to be understood that, in some embodiments, the second condition 124 could be selected as the fused instruction condition 132, in which case the values designated by the operands 136, 138 would be reversed.

Accordingly, in this example, the fused instruction 130 is a MOVPEQ ("move [paired] if equal") instruction, and the fused instruction condition 132, like the first condition 116, is "EQ" or "equals" and is further used to process the condition code 36. If the fused instruction condition 132 evaluates to "true," the MOVPEQ fused instruction 130 indicates an operation writing the "if-true" source value designated by the operand 136 (i.e., the value of register $R_2$) into the target register designated by the operand 134 (i.e., register $R_1$). If the fused instruction condition 132 evaluates to "false," the MOVPEQ fused instruction 130 indicates an operation writing the "if-false" value designated by the operand 138 (i.e., the value of register $R_3$) into the target register designated by the operand 134 (i.e., register $R_1$). As a result, the MOVPEQ fused instruction 130 performs the operations of both the MOVEQ first conditional write instruction 114 and the MOVNE second conditional write instruction 122 in a single instruction, thus improving CPU performance by removing a redundant conditional write instruction and eliminating the possibility of a read-after-write hazard associated with the MOVEQ/MOVNE conditional instruction pair.

With continuing reference to FIG. 5, the implementation of the rules discussed above with respect to the fused instruction 130 is illustrated in an example where the conditions of the conditional write instructions fetched from the instruction stream 18 are reversed. As before, it is assumed, for purposes of this example, that one or more previous instructions have caused the condition code 36 in the status register 34 of FIG. 1 to indicate either an "equal" or a "not equal" condition (i.e., one of two logically opposite conditions). Detected first in a detected instruction stream 140 is a MOVNE first conditional write instruction 142, which evaluates a first condition 144 (i.e., "NE" or "not equal"), and which also specifies a target register $R_1$ designated by an operand 146 and a source register $R_2$ designated by an operand 148. Following the MOVNE first conditional write instruction 142 in the detected instruction stream 140 is a MOVEQ second conditional write instruction 150. The MOVEQ second conditional write instruction 150 evaluates a second condition 152 ("EQ" or "equal," which is the logical opposite of the first condition 144), and also specifies a target register $R_1$ designated by an operand 154 (the same register designated by operand 146 of the MOVNE first conditional write instruction 142), and a source register $R_3$ designated by an operand 156.

A fused instruction 158 illustrates the results of processing the MOVNE first conditional write instruction 142 and the MOVEQ second conditional write instruction 150 by the instruction processing circuit 14 of FIG. 1. The fused instruction 158 evaluates a fused instruction condition 160, and also specifies a target register designated by an operand 162, an "if-true" source value designated by an operand 164, and an "if-false" source value designated by an operand 166. In this example, if the operand 148 of the MOVNE first conditional write instruction 142 and the operand 156 of the MOVEQ second conditional write instruction 150 both specify registers, the fused instruction 158 is a MOVPNE ("move [paired] if not equal") instruction, and the first condition 144 ("NE" or "not equal") of the MOVNE first conditional write instruction 142 is used as the fused instruction condition 160. Additionally, the operand 162 designates the same target register $R_1$ as the operand 146 and the operand 154; the operand 164 designates the source register $R_2$ indicated by the operand 148 as the "if-true" source value; and the operand 166 designates the source register $R_1$ indicated by the operand 156 as the "if-false" source value.

Returning now to the decision point at block 92 of FIG. 4B, if the source operands for the first instruction and the second instruction include both a non-zero immediate value and an immediate value of zero, the instruction processing circuit, in this example, determines which of the instructions specifies the non-zero immediate value as a source operand (block 100 of FIG. 4B). The instruction processing circuit then selects the condition evaluated by the instruction having the non-zero immediate value source operand for use as a fused instruction condition (block 102 of FIG. 4B). The instruction processing circuit generates a fused instruction that evaluates the fused instruction condition, and specifies as operands the target register $R_X$, the non-zero immediate value, and an immediate value of zero (block 104 of FIG. 4B). Although not illustrated in this example, it is to be understood that, in some embodiments, the condition evaluated by the instruction having the zero immediate value source operand could be selected for use as the fused instruction condition, in which case the instruction processing circuit would specify as operands the target register $R_X$, an immediate value of zero, and the non-zero immediate value. Processing then resumes at block 98 of FIG. 4C, as discussed in detail below.

Figure 6:
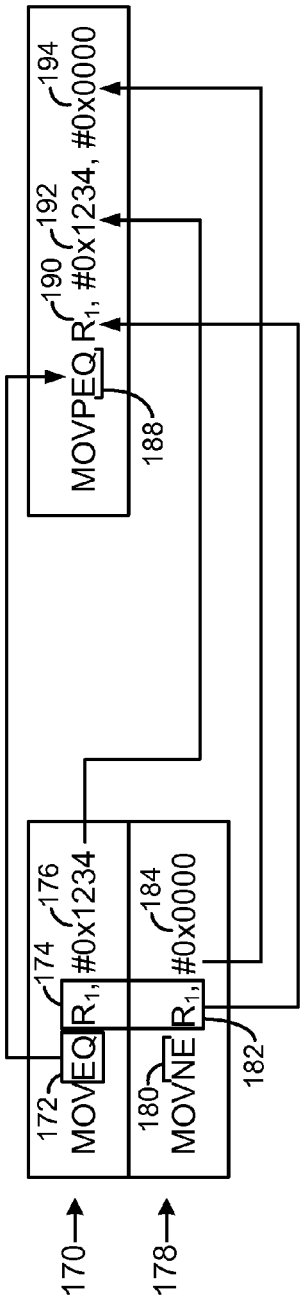
FIG. 6 is a diagram illustrating other exemplary fused instructions generated based on conditional write instructions having zero and non-zero immediate value operands and opposite conditions.
Figure 6:
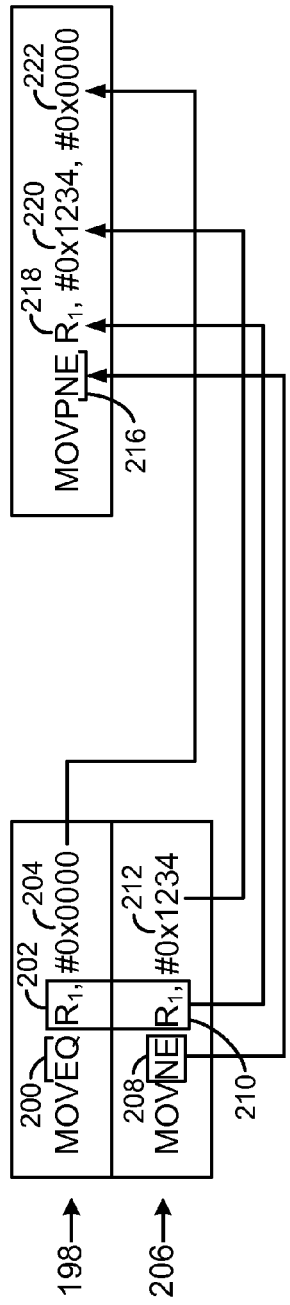

An exemplary fused instruction generated based on conditional write instructions having zero and non-zero immediate value operands is shown in FIG. 6, with reference to FIG. 1. In the example illustrated by FIG. 6, a detected instruction stream 168 depicts a series of instructions detected by the instruction processing circuit 14 as they proceed through the instruction stream 18 of FIG. 1. In this example, it is assumed that one or more previous instructions have caused the condition code 36 in the status register 34 of FIG. 1 to indicate either an "equal" or a "not equal" condition (i.e., one of two logically opposite conditions).

Detected first in the detected instruction stream 168 is a first conditional write instruction 170, which in this example is the ARM architecture MOVEQ ("move if equal") instruction. The MOVEQ first conditional write instruction 170 processes the condition code 36 by evaluating a first condition 172 (i.e., "EQ" or "equal"). The MOVEQ first conditional write instruction 170 also specifies a target register (one of the registers 16(0-M)) designated by an operand 174, and a source immediate value designated by an operand 176. Here, the target register is register $R_1$, and the source immediate value designated by the operand 176 is an immediate value #0x1234. If the condition code 36 indicates a condition of "equal," the MOVEQ first conditional write instruction 170 indicates an operation writing the source immediate value #0x1234 designated by the operand 176 into the target register $R_1$ designated by the operand 174.

Next in the detected instruction stream 168 is a second conditional write instruction 178, which is the ARM architecture MOVNE ("move if not equal") instruction. The MOVNE second conditional write instruction 178 processes the condition code 36 by evaluating a second condition 180 ("NE" or "not equal," which is the logical opposite of the first condition 172). The MOVNE second conditional write instruction 178 also specifies a target register designated by an operand 182 (which is the same register designated by the operand 174 of the MOVEQ first conditional write instruction 170), and a source immediate value designated by an operand 184. In this example, the target register is register $R_1$, and the source immediate value designated by the operand 184 is a zero immediate value (#0x0000). If the condition code 36 indicates a condition of "not equal," the MOVNE second conditional write instruction 178 indicates an operation writing the source immediate value 0x40000 designated by the operand 184 into the target register $R_1$ designated by the operand 182.

A fused instruction 186 illustrates the results of processing the MOVEQ first conditional write instruction 170 and the MOVNE second conditional write instruction 178 by the instruction processing circuit 14 of FIG. 1. The fused instruction 186 evaluates a fused instruction condition 188, and also specifies a target register designated by an operand 190, an "if-true" source value designated by an operand 192, and an "if-false" source value designated by an operand 194. If the operand 176 of the MOVEQ first conditional write instruction 170 and the operand 184 of the MOVNE second conditional write instruction 178 both designate immediate values, and if one of the source immediate values designated by the operand 176 and the operand 184 is non-zero while the other is zero, the fused instruction 186 is generated according to the following rules: the condition of the conditional write instruction specifying a non-zero immediate value is used as the fused instruction condition 188 (in this example, the first condition 172 is used as the fused instruction condition 188); the operand 190 designates the same target register as the operand 174 and the operand 182; the operand 192, designates the non-zero source immediate value (in this example, the source immediate value #0x1234 designated by the operand 176) as the "if-true" source value; and the operand 194 designates an immediate value of zero (#0x0000) (designated by the operand 184) as the "if-false" source value. Although not illustrated in this example, it is to be understood that, in some embodiments, the second operand 180 could be selected as the fused instruction condition 188, in which case the values designated by the operands 192, 194 would be reversed.

Accordingly, in this example, the fused instruction 186 is a MOVPEQ ("move [paired] if equal") instruction, and the fused instruction condition 188, like the first condition 172, is "EQ" or "equals" and is used to process the condition code 36. If the fused instruction condition 188 evaluates to "true," the MOVPEQ fused instruction 186 indicates an operation writing the "if-true" source value designated by the operand 192, (i.e., the source immediate value #0x1234) into the target register designated by the operand 190 (i.e., register $R_1$). If the fused instruction condition 188 evaluates to "false," the MOVPEQ fused instruction 186 indicates an operation writing the "if-false" value designated by the operand 194 (i.e., the source immediate value #0x0000) into the target register designated by the operand 190 (i.e., register $R_1$). As a result, the MOVPEQ fused instruction 186 performs the operations of both the MOVEQ first conditional write instruction 170 and the MOVNE second conditional write instruction 178 in a single instruction, thus improving CPU performance by removing a redundant conditional write instruction and eliminating the possibility of a read-after-write hazard associated with the MOVEQ/MOVNE conditional instruction pair.

With continuing reference to FIG. 6, the implementation of the rules discussed above with respect to the MOVPEQ fused instruction 186 is illustrated in an example where the source immediate values specified by the conditional write instructions fetched from the instruction stream 18 of FIG. 1 are reversed. In this example, as before, it is assumed that one or more previous instructions have caused the condition code 36 in the status register 34 of FIG. 1 to indicate either an "equal" or a, "not equal" condition (i.e., one of two logically opposite conditions). Detected first in a detected instruction stream 196 is a MOVEQ first conditional write instruction 198, which evaluates a first condition 200 (i.e., "EQ" or "equal"), and which also specifies a target register $R_1$ designated by an operand 202 and a source immediate value #0x0000 designated by an operand 204. Following the MOVEQ first conditional write instruction 198 in the detected instruction stream 196 is a MOVNE second conditional write instruction 206. The MOVNE second conditional write instruction 206 evaluates a second condition 208 ("NE" or "not equal," which is the logical opposite of the first condition 200), and also specifies a target register $R_1$ designated by an operand 210 (the same register designated by the operand 202 of the MOVEQ first conditional write instruction 198), and a source immediate value #0x1234 designated by an operand 212.

A fused instruction 214 illustrates the results of processing the MOVEQ first conditional write instruction 198 and the MOVNE second conditional write instruction 206 by the instruction processing circuit 14 of FIG. 1. The fused instruction 214 evaluates a fused instruction condition 216, and also specifies a target register designated by an operand 218, an "if-true" source value designated by an operand 220, and an "if-false" source value designated by an operand 222. Here, because the operand 204 of the MOVEQ first conditional write instruction 198 designates a source immediate value of zero while the operand 212 of the MOVNE second conditional write instruction 206 specifies a non-zero source immediate value, the fused instruction 214 is a MOVPNE ("move [paired] if not equal") instruction, and the second condition 208 ("NE" or "not equal") of the MOVNE second conditional write instruction 206 is used as the fused instruction condition 216. Additionally, the operand 218 designates the same target register $R_1$ as the operand 202 and the operand 210; the operand 220 designates the source immediate value #0x1234 designated by the operand 212 as the "if-true" source value;

and the operand 222 designates the source immediate value #0x0000 designated by the operand 204 as the "if-false" source value.

Referring back to the decision point at block 92 of FIG. 4B, some embodiments may provide that detected conditional write instructions having other types of source operands (e.g., one conditional instruction having a register operand and a second conditional instruction having a zero or non-zero immediate value operand) may be fused. In this case, the instruction processing circuit selects the condition of one of the detected conditional instructions as the fused instruction condition (block 106 of FIG. 4B). The instruction processing circuit then generates a fused instruction that evaluates the fused instruction condition, and specifies as operands the target register $R_X$, an "if-true" operand comprising the operand of the detected conditional instruction that corresponds to the fused instruction condition, and an "if-false" operand comprising the operand of the detected conditional instruction that evaluates the condition logically opposite to the fused instruction condition (block 108 of FIG. 4B). Processing then resumes at block 98 of FIG. 4C.

FIG. 4C is provided to illustrate operations for replacing one of the conditional write instructions in the instruction stream with a generated fused instruction. In FIG. 4C, the instruction processing circuit, after generating the fused instruction, replaces either the first instruction or the second instruction in the instruction stream with the fused instruction, based on an instruction selection flag such as the instruction selection flag 32 of FIG. 1 (block 98 of FIG. 4C). In some embodiments, the instruction selection flag may indicate that the instruction fetched from the instruction stream in a specified position (e.g., first or second) is always replaced. The instruction processing circuit then determines whether the first or second instruction was replaced in the instruction stream with the fused instruction (block 109 of FIG. 4C). If the first detected instruction was replaced with the fused instruction, the instruction processing circuit substitutes an instruction indicating no operation (i.e., NOP) for the second instruction, or removes the second instruction from the instruction stream (block 110 of FIG. 4C). If the second detected instruction was replaced with the fused instruction, the instruction processing circuit may optionally substitute an instruction indicating no operation (i.e., NOP) for the first instruction, or may remove the first instruction from the instruction stream (block 111 of FIG. 4C). In some embodiments, the first instruction may remain unmodified in the instruction stream, as the subsequent fused instruction will either repeat the function of the first instruction or perform the function of the second instruction. Processing then resumes at block 80 of FIG. 4A.

Figure 7:
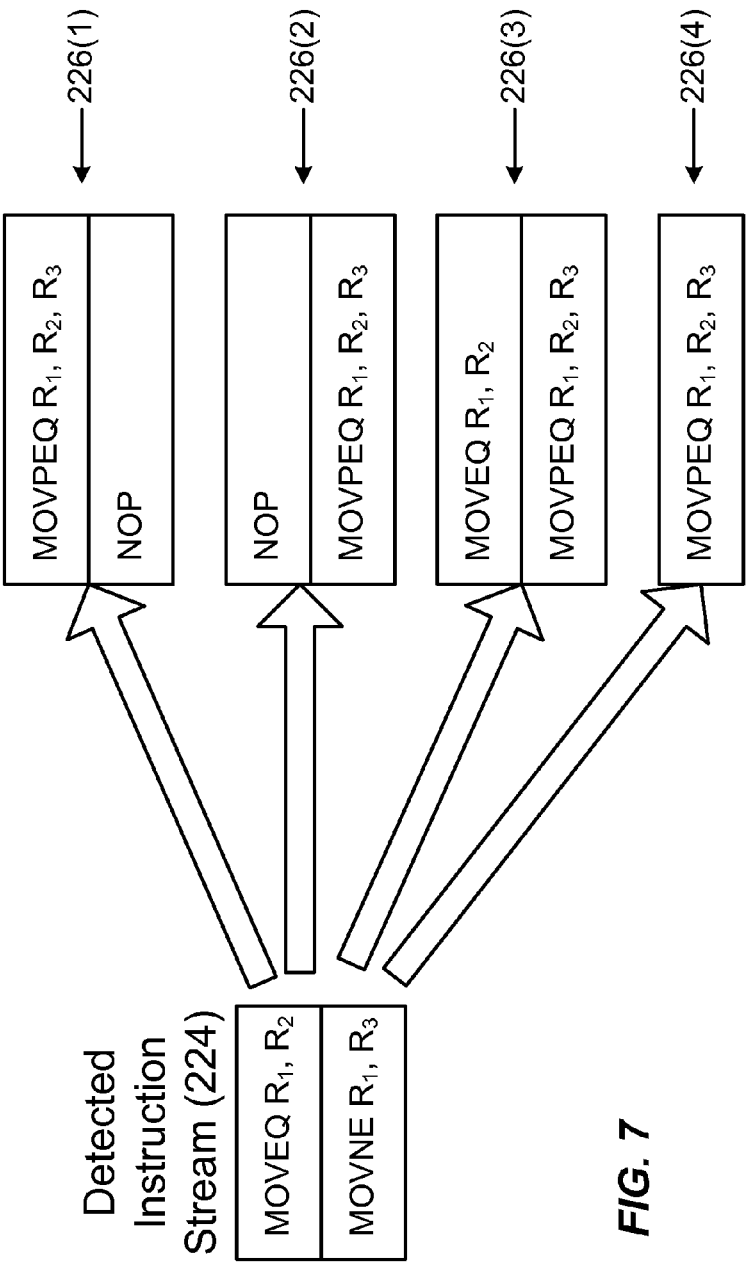
FIG. 7 is a diagram illustrating other exemplary fused instructions generated based on conditional write instructions having register operands.

As noted above with respect to FIG. 4C, either the first instruction or the second instruction will be replaced by the generated fused instruction, and the instruction that is not replaced may be replaced by an instruction indicating no operation (i.e., NOP) or removed entirely from the instruction stream. Thus, the instruction processing circuit may process a given detected instruction stream into different resulting instruction streams that include the generated fused instruction. In this regard, FIG. 7 shows an exemplary detected instruction stream 224 including a set of non-fused conditional write instructions, and corresponding resulting instruction stream examples 226(1)-226(4) that may be generated by the instruction processing circuit 14 of FIG. 1. In this example, a detected instruction stream 224 includes two consecutive ARM instructions: a MOVEQ first conditional write instruction conditionally writing a value from source register $R_2$ to target register $R_1$ if the condition code 36 indicates an "equal" condition, immediately followed by a. MOVNE second conditional write instruction conditionally writing a value from source register $R_3$ to target register $R_4$ if the condition code 36 indicates a "not equal" condition.

Resulting instruction stream examples 226 illustrate exemplary sequences of instructions, including fused instructions, into which the instructions in the detected instruction stream 224 may be processed by the instruction processing circuit 14 of FIG. 1. In some embodiments, the MOVEQ first conditional write instruction in the detected instruction stream 224 may be replaced with the fused instruction, and the MOVNE second conditional write instruction may be replaced with an instruction indicating no operation (i.e., NOP). Accordingly, exemplary instruction stream 226(1) comprises a fused instruction MOVEPEQ, followed by an NOP.

Some embodiments may provide that the MOVEQ first conditional write instruction in the detected instruction stream 224 may be replaced with an NOP instruction, while the MOVNE second conditional write instruction is replaced with the fused instruction. Thus, in instruction stream 226(2), an NOP instruction is followed by the fused instruction MOVPEQ.

According to some embodiments, the MOVEQ first conditional write instruction in the detected instruction stream 224 may remain unmodified in the resulting instruction stream, while the MOVNE second conditional write instruction is replaced with the fused instruction. Therefore, in instruction stream 226(3), the original MOVEQ first conditional write instruction is followed by the fused instruction MOVPEQ.

In some embodiments described herein, either the MOVEQ first conditional write instruction or the MOVNE second conditional write instruction will be replaced by the generated fused instruction, and the instruction that is not replaced will be removed entirely from the instruction stream. Accordingly, instruction stream 226(4) comprises only the fused instruction MOVPEQ.

Figure 8:
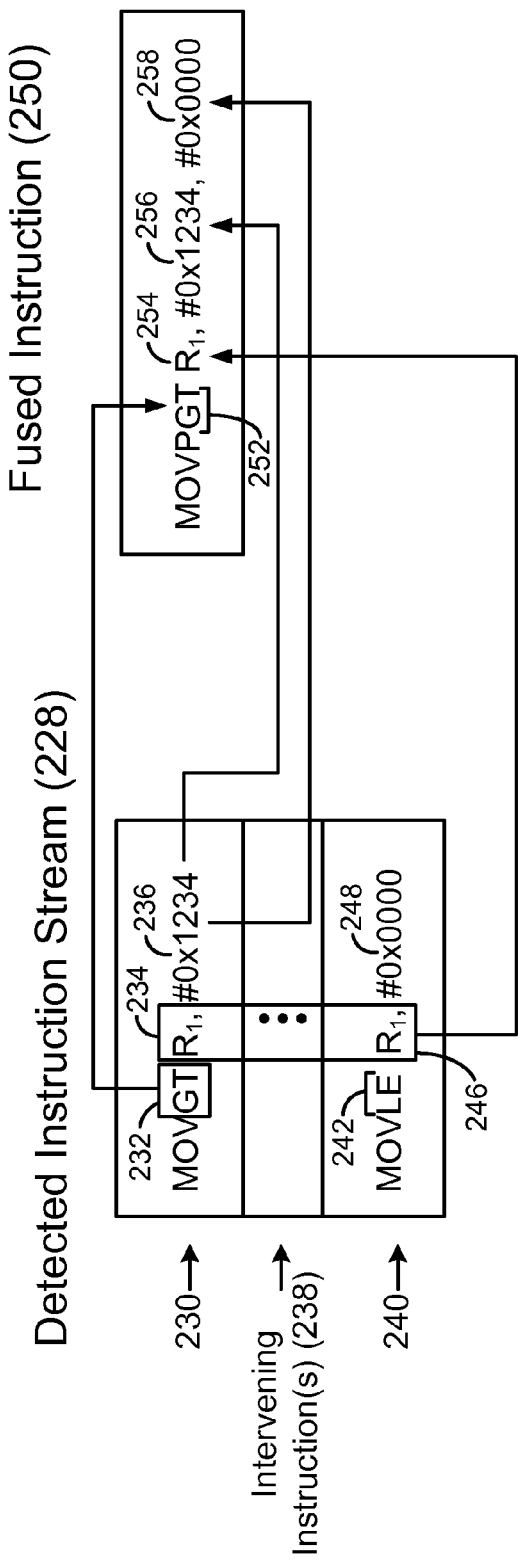
FIG. 8 is a diagram illustrating an exemplary fused instruction generated based on non-consecutive conditional write instructions.

As mentioned above with respect to FIG. 4A, the conditional write instructions that may be used to generate a fused instruction may be fetched adjacent to one another from the instruction stream, or they may be separated in the instruction stream by other intervening instructions. With respect to the latter scenario, FIG. 8, with reference to FIG. 1, illustrates an exemplary conversion of non-consecutive conditional write instructions into a fused instruction. In FIG. 8, a detected instruction stream 228 depicts a series of instructions detected by the instruction processing circuit 14 as they proceed through the instruction stream 18 of FIG. 1. For purposes of this example, it is assumed that one or more previous instructions have caused the condition code 36 in the status register 34 of FIG. 1 to indicate either a "greater than" or a "less than or equal" condition (i.e. one of two logically opposite conditions).

Detected first in the detected instruction stream 228 is a first conditional write instruction 230, which in this example is the ARM architecture MOVGT ("move if greater than") instruction. The MOVGT first conditional write instruction 230 processes the condition code 36 by evaluating a first condition 232 (i.e., "GT" or "greater than"). The MOVGT first conditional write instruction 230 also specifies a target register (one of the registers 16(0-M)) designated by an operand 234, and a source immediate value designated by an operand 236. In this example, the target register is register $R_1$, and the source immediate value designated by the operand 236 is an immediate value #0x1234. If the condition code 36 indicates a condition of "greater than," the MOVGT first conditional write instruction 230 indicates an operation writing the source immediate value #10x1234 designated by the operand 236 into the target register R₁ designated by the operand 234.

Following the MOVGT first conditional write instruction 230 in the detected instruction stream 228 is at least one intervening instruction 238. As discussed above, the at least one intervening instruction 238 may be any valid instruction, other than an instruction that alters a value of the condition code 36, or that writes to the target register R₁ (block 90 of FIG. 4A). Either of these occurrences eliminates the possibility for generating a fused instruction. For instance, if the at least one intervening instruction 238 modifies the value of the condition code 36, a later-fetched conditional write instruction will evaluate its condition based on a different result than that upon which the MOVGT first conditional write instruction 230 evaluated its condition. Similarly, if the at least one intervening instruction 238 writes to the target register R₁, then it may not be possible to generate a fused instruction that accurately reproduces the effects of the detected conditional write instructions.

After the at least one intervening instruction 238, a second conditional write instruction 240, which is the ARM architecture MOVLE ("move if less than or equal") instruction, is fetched in the detected instruction stream 228. The MOVLE second conditional write instruction 240 processes the condition code 36 by evaluating a second condition 242 ("LE" or "less than or equal," which is the logical opposite of the first condition 232). The MOVLE second conditional write instruction 240 also specifies a target register designated by an operand 246 (which is the same register designated by the operand 234 of the MOVGT first conditional write instruction 230), and a source immediate value designated by an operand 248. In this example, the target register is register R₁, and the source immediate value designated by the operand 248 is a zero immediate value (#0x0000). If the condition code 36 indicates a condition of "less than or equal," the MOVLE second conditional write instruction 240 indicates an operation writing the source immediate value 0x#0000 designated by the operand 248 into the target register R₁ designated by the operand 246.

A fused instruction 250 illustrates the results of processing the MOVGT first conditional write instruction 230 and the MOVLE second conditional write instruction 240 by the instruction processing circuit 14. The fused instruction 250 evaluates a fused instruction condition 252, and also specifies a target register designated by an operand 254, an "if-true" source value designated by an operand 256, and an "if-false" source value designated by an operand 258. According to the exemplary rules for processing conditional write instructions having non-zero/zero immediate value operands, as discussed above with respect to FIG. 6, the fused instruction 250 is a MOVPGT ("move [paired] if greater than") instruction, and the fused instruction condition 252, like the first condition 232, is "GT" or "greater than," and is used to process the condition code 36. If the fused instruction condition 252 evaluates to "true," the MOVPGT fused instruction 250 indicates an operation writing the "if-true" source value designated by the operand 256 (i.e., the source immediate value #0x1234) into the target register designated by the operand 254 (i.e., register R₁). If the fused instruction condition 252 evaluates to "false," the MOVPGT fused instruction 250 indicates an operation writing the "if-false" value designated by the operand 258 (i.e., the source immediate value #0x0000) into the target register designated by the operand 254 (i.e., register R₁). Although not illustrated in this example, it is to be understood that, in some embodiments, the second condition 242 could be selected as the fused instruction condition 252, in which case the values designated by the operands 256, 258 would be reversed.

The instruction processing circuits fusing conditional write instructions having opposite conditions according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 9:
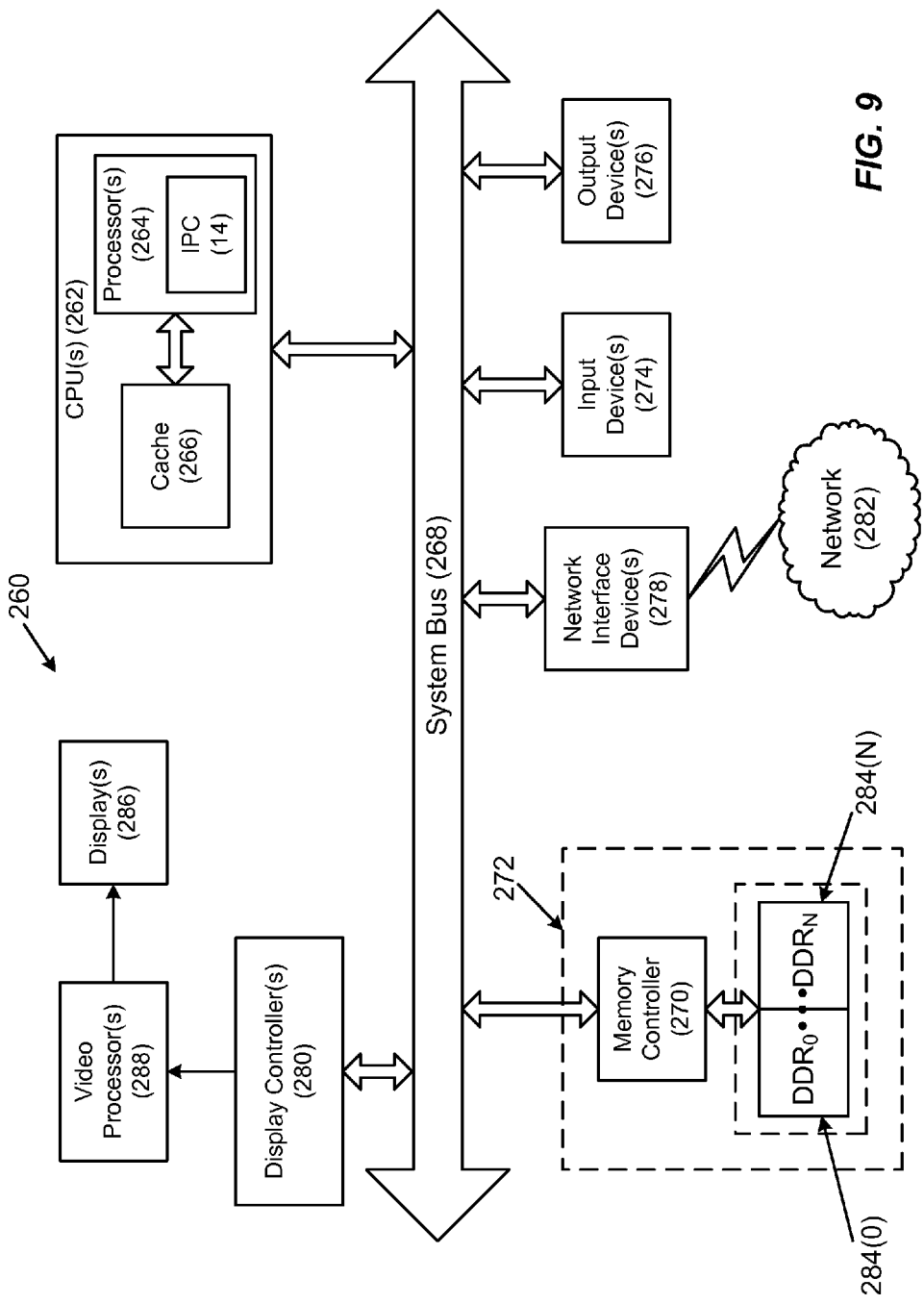
FIG. 9 is a block diagram of an exemplary processor-based system that can include instruction processing circuits, including the instruction processing circuit of FIG. 1, configured to detect conditional write instructions having opposite conditions and configured to generate a fused instruction.

In this regard, FIG. 9 illustrates an example of a processor-based system 260 that can employ the instruction processing circuit 14 illustrated in FIG. 1. In this example, the processor-based system 260 includes one or more central processing units (CPUs) 262, each including one or more processors 264. The processor(s) 264 may, comprise the instruction processing circuit (IPC) 14. The CPU(s) 262 may have cache memory 266 coupled to the processor(s) 264 for rapid access to temporarily stored data. The CPU(s) 262 is coupled to a system bus 268 and can intercouple master and slave devices included in the processor-based system 260. As is well known, the CPU(s) 262 communicates with these other devices by exchanging address, control, and data information over the system bus 268. For example, the CPU(s) 262 can communicate bus transaction requests to a memory controller 270, as an example of a slave device. Although not illustrated in FIG. 9, multiple system buses 268 could be provided.

Other master and slave devices can be connected to the system bus 268. As illustrated in FIG. 9, these devices can include a memory system 272, one or more input devices 274, one or more output devices 276, one or more network interface devices 278, and one or more display controllers 280, as examples. The input device(s) 274 can include any type of input device, including but not limited to input keys, switches, voice processors, etc. The output device(s) 276 can include any type of output device, including but not limited to audio, video, other visual indicators, etc. The network interface device(s) 278 can be any device(s) configured to allow exchange of data to and from a network 282. The network 282 can be any type of network, including but not limited to a wired or wireless network, a private or public network, a local area network (LAN), a wide local area network (WLAN), and the Internet. The network interface device(s) 278 can be configured to support any type of communication protocol desired. The memory system 272 can include one or more memory units 284(0-N).

The CPU(s) 262 may also be configured to access the display controller(s) 280 over the system bus 268 to control information sent to one or more displays 286. The display controller(s) 280 sends information to the display(s) 286 to be displayed via one or more video processors 288, which process the information to be displayed into a format suitable for the display(s) 286. The display(s) 286 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The master devices and slave devices described herein may be employed in any circuit, hardware component, integrated circuit (IC), IC chip, or semiconductor die, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a DSP, an Application Specific Integrated Circuit (ASIC), an FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A hardware circuit configured to:
   detect a first conditional write instruction in an instruction stream indicating an operation writing a first value to a target register based on evaluating a first condition;
   detect a second conditional write instruction in the instruction stream indicating an operation writing a second value to the target register based on evaluating a second condition that is a logical opposite of the first condition;
   select one of the first condition or the second condition as a fused instruction condition;
   select one of the first value or the second value corresponding to the fused instruction condition as an if-true value;
   select one of the first value or the second value not corresponding to the fused instruction condition as an if-false value; and
   generate a fused instruction indicating an operation selectively writing the if-true value to the target register if the fused instruction condition evaluates to true, and selectively writing the if-false value to the target register if the fused instruction condition evaluates to false.

2. The hardware circuit of claim 1 configured to:
   detect the first conditional write instruction indicating a first source register providing the first value; and
   detect the second conditional write instruction indicating a second source register providing the second value.

3. The hardware circuit of claim 1 configured to:
   detect the first conditional write instruction indicating the first value comprising a first immediate value that is non-zero; and
   detect the second conditional write instruction indicating the second value comprising a second immediate value of zero.

4. The hardware circuit of claim 1 configured to:
   detect the first conditional write instruction indicating a first source register providing the first value; and
   detect the second conditional write instruction indicating the second value comprising an immediate value that is non-zero.

5. The hardware circuit of claim 1 configured to:
   detect the first conditional write instruction indicating a first source register providing the first value; and
   detect the second conditional write instruction indicating the second value comprising an immediate value that is zero.

6. The hardware circuit of claim 1 configured to detect the second conditional write instruction located adjacent to the first conditional write instruction in the instruction stream.

7. The hardware circuit of claim 1 further configured to:
   detect at least one intervening instruction fetched between the first conditional write instruction and the second conditional write instruction in the instruction stream; and
   determine whether the at least one intervening instruction maintains a value of a condition code in a status register and does not write to the target register;

the hardware circuit configured to generate the fused instruction if the at least one intervening instruction maintains the value of the condition code and does not write to the target register.

8. The hardware circuit of claim 1 disposed in a circuit comprised from the group consisting of: an instruction fetch circuit, an instruction decode circuit, and an instruction queue.

9. The hardware circuit of claim 1 configured to detect an IF_EQ_WRITE as the first conditional write instruction and detect an IF_NE_WRITE as the second conditional write instruction.

10. The hardware circuit of claim 1, further configured to:
select one of the first conditional write instruction or the second conditional write instruction as a selected instruction based on an instruction selection flag; and
replace the selected instruction in the instruction stream with the fused instruction.

11. The hardware circuit of claim 10 further configured to:
replace the first conditional write instruction or the second conditional write instruction not corresponding to the selected instruction with an instruction indicating no operation.

12. The hardware circuit of claim 10 further configured to:
remove the first conditional write instruction or the second conditional write instruction not corresponding to the selected instruction from the instruction stream.

13. The hardware circuit of claim 1 integrated into a semiconductor die.

14. The hardware circuit of claim 1 further comprising a device selected from the group consisting of: a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

15. An instruction processing circuit, comprising:
a means for detecting a first conditional write instruction in an instruction stream indicating an operation writing a first value to a target register based on evaluating a first condition;
a means for detecting a second conditional write instruction in the instruction stream indicating an operation writing a second value to the target register based on evaluating a second condition that is a logical opposite of the first condition;
a means for selecting one of the first condition or the second condition as a fused instruction condition;
a means for selecting one of the first value or the second value corresponding to the fused instruction condition as an if-true value;
a means for selecting one of the first value or the second value not corresponding to the fused instruction condition as an if-false value; and
a means for generating a fused instruction indicating an operation selectively writing the if-true value to the target register if the fused instruction condition evaluates to true, and selectively writing the if-false value to the target register if the fused instruction condition evaluates to false.

16. A method for processing computer instructions, comprising:
detecting a first conditional write instruction in an instruction stream indicating an operation writing a first value to a target register based on evaluating a first condition;
detecting a second conditional write instruction in the instruction stream indicating an operation writing a second value to the target register based on evaluating a second condition that is a logical opposite of the first condition;
selecting one of the first condition or the second condition as a fused instruction condition;
selecting one of the first value or the second value corresponding to the fused instruction condition as an if-true value;
selecting one of the first value or the second value not corresponding to the fused instruction condition as an if-false value; and
generating a fused instruction indicating an operation selectively writing the if-true value to the target register if the fused instruction condition evaluates to true, and selectively writing the if-false value to the target register if the fused instruction condition evaluates to false.

17. The method of claim 16, comprising:
detecting the first conditional write instruction indicating a first source register providing the first value; and
detecting the second conditional write instruction indicating a second source register providing the second value.

18. The method of claim 16, comprising:
detecting the first conditional write instruction indicating the first value comprising a first immediate value that is non-zero; and
detecting the second conditional write instruction indicating the second value comprising a second immediate value of zero.

19. The method of claim 16, comprising:
detecting the first conditional write instruction indicating a first source register providing the first value; and
detecting the second conditional write instruction indicating the second value comprising an immediate value that is non-zero.

20. The method of claim 16, comprising:
detecting the first conditional write instruction indicating a first source register providing the first value; and
detecting the second conditional write instruction indicating the second value comprising an immediate value that is zero.

21. A non-transitory computer-readable medium, having stored thereon computer-executable instructions to cause a processor to implement a method comprising:
detecting a first conditional write instruction in an instruction stream indicating an operation writing a first value to a target register based on evaluating a first condition;
detecting a second conditional write instruction in the instruction stream indicating an operation writing a second value to the target register based on evaluating a second condition that is a logical opposite of the first condition;
selecting one of the first condition or the second condition as a fused instruction condition;
selecting one of the first value or the second value corresponding to the fused instruction condition as an if-true value;
selecting one of the first value or the second value not corresponding to the fused instruction condition as an if-false value; and generating a fused instruction indicating an operation selectively writing the if-true value to the target register if the fused instruction condition evaluates to true, and selectively writing the if-false value to the target register if the fused instruction condition evaluates to false.

22. The non-transitory computer-readable medium of claim 21, having stored thereon the computer-executable instructions to cause the processor to implement the method comprising:
   detecting the first conditional write instruction indicating a first source register providing the first value; and
   detecting the second conditional write instruction indicating a second source register providing the second value.

23. The non-transitory computer-readable medium of claim 21, having stored thereon the computer-executable instructions to cause the processor to implement the method comprising:
   detecting the first conditional write instruction indicating the first value comprising a first immediate value that is non-zero; and
   detecting the second conditional write instruction indicating the second value comprising a second immediate value of zero.

24. The non-transitory computer-readable medium of claim 21, having stored thereon the computer-executable instructions to cause the processor to implement the method comprising:
   detecting the first conditional write instruction indicating a first source register providing the first value; and
   detecting the second conditional write instruction indicating the second value comprising an immediate value that is non-zero.

25. The non-transitory computer-readable medium of claim 21, having stored thereon the computer-executable instructions to cause the processor to implement the method comprising:
   detecting the first conditional write instruction indicating a first source register providing the first value; and
   detecting the second conditional write instruction indicating the second value comprising an immediate value that is zero.

* * * * *